July 9, 1940.  W. R. MILLICAN  2,207,129
FLOW VALVE
Filed Oct. 5, 1937
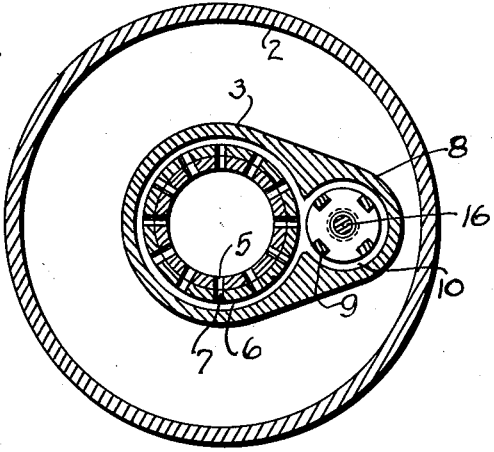
Fig.3.
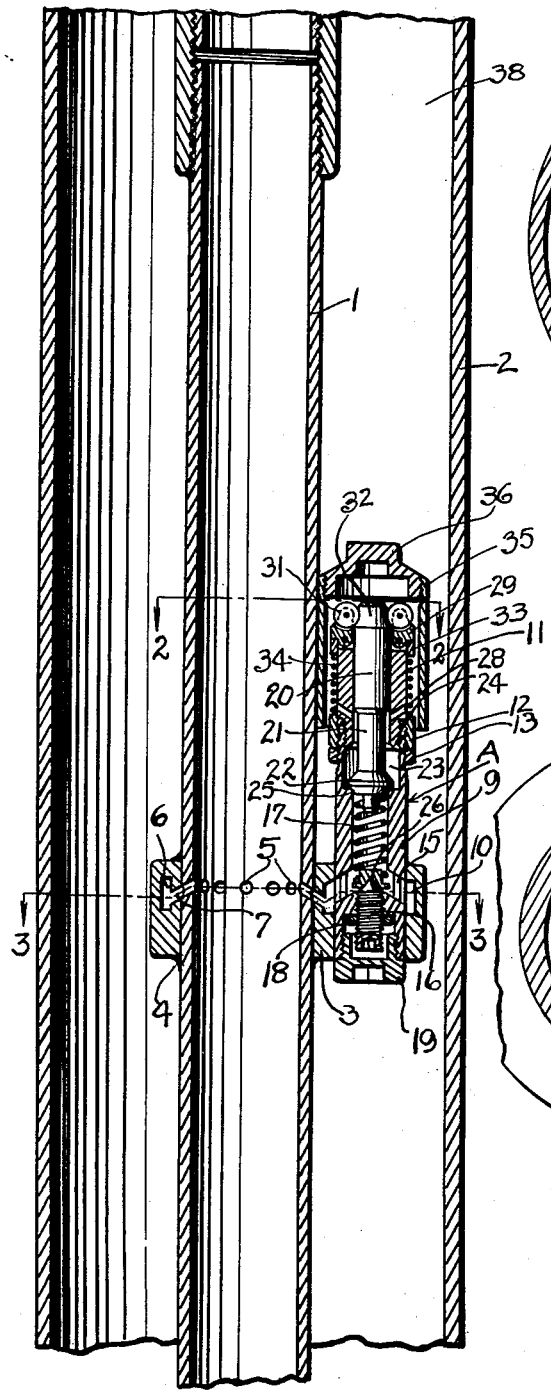
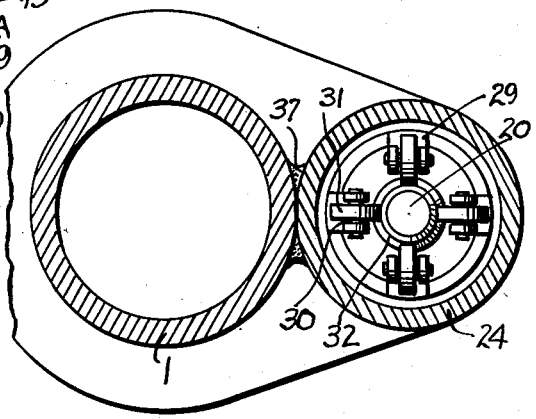
Fig.2.
Fig.1.
Word Ray Millican Inventor
By Jesse R. Stone & Lister B. Clark
Attorneys Patented July 9, 1940

2,207,129

UNITED STATES PATENT OFFICE 2,207,129

FLOW VALVE

Word Ray Millican, Dallas, Tex.

Application October 5, 1937, Serial No. 167,355

8 Claims. (Cl. 103—232)

My invention relates to flow valves such as are ordinarily employed in raising liquids from deep wells.

Flow valves of this character are in general use and serve the purpose of opening up a passage, from the well casing into the well tubing or flow line, for pressure fluid, such as gas or air under pressure, which aerates the column of liquid and raises it upwardly to the surface where it is discharged. The purpose of the valve is to control the pressure under which the opening in the flow tube is opened and/or closed.

It is an object of the present invention to provide a flow valve in which the differential pressure necessary to open the valve is greater than the differential pressure tending to close the valve.

I desire to provide a valve which will open under the pressure of a head of fluid in the tubing and which will stay open until the pressure in the tubing has been reduced by a predetermined amount.

Another object of the invention is to provide a flow valve in which the opening of the said valve is resisted by resilient means which have no effect in preventing the closing of the valve.

The invention resides particularly in the details of construction of the valve which will be more clearly understood from reference to the drawing herewith.

In Fig. 1 I have shown a central longitudinal section through a flow line or eduction tube positioned within a well casing and equipped with a flow valve construction in accordance with my invention.

Fig. 2 is an enlarged view of the tubing and valve taken in section on the line 2—2 of Fig. 1.

Fig. 3 is a transverse section on the plane 3—3 of Fig. 1.

With reference to Fig. 1, I have shown a flow line or eduction tube 1 placed concentrically within a well having a casing 2 therein. Positioned on the said flow line or tube I have shown one of my flow valves indicated generally at A. It is understood that I may have a plurality of flow valves such as that shown in Fig. 1, which may be spaced apart in the usual manner along the tubing at the distances desired. In valves of this sort the liquid tends to rise in the tube 1 to a certain predetermined height in the well and in lowering the level of the liquid in the casing, so as to expose the openings adjacent the lower end of the tube, the use of flow valves of this character are more or less commonly employed.

In the construction of my control valve I provide a special collar 3 about the tubing which may, if desired, be placed at a joint therein or may be slipped down over the tubing and welded thereto by bonds of welding material such as 4. The tubing is formed with a series of upwardly inclined perforations 5 therein to admit air or gas under pressure from the flow valve. The body of the collar 3 about the tubing is formed with an annular channel 6 therein from which are upwardly directed passages 7 connecting with the openings 5 in the tubing.

The said collar 3 is extended laterally on one side, as shown best in Fig. 3, to form a support 8 for the body of my flow valve. The projecting portion 8 is formed with a central opening longitudinally thereof to receive the lower portion 9 of the valve housing. About this longitudinal opening is an annular passage or channel 10 into which the pressure fluid from the valve may pass. On the side of the projection adjacent the flow tube the channel 10 connects directly with the channel 6 in the collar, thus allowing the pressure fluid to pass directly into the tubing.

The body 9 of the valve is of tubular construction, the upper end of which is threaded for engagement with the valve guide member 11. On the outer portion of the upper end of the body is threaded a collar 12 and a lock nut 13. The portion of the body adjacent the collar 3 is formed with a plurality of downwardly extending passages 15, which connect with the channel 10 in the collar extension. Below these passages the interior of the valve body is threaded to receive an adjusting screw 16, which is threaded within the central opening in the body and adjustable longitudinally to vary the tension upon a spring 17, which will be later described. There is a lock nut 18 on the set screw to fix it in position after proper adjustment has been made. The lower end of the valve body is closed by a threaded plug 19.

Within the guide sleeve 11 is the valve 20. This valve fits within the guide sleeve 11 and the lower end is reduced in diameter at 21 to provide clearance between the same and the guide sleeve. At the lower end of the valve stem 21 is a valve head 22, the upper and lower ends of which are beveled to fit within the seats which are provided at the upper and lower ends of the valve chamber 23. The upper valve seat is shown at 24 and the lower valve seat at 25. Below the valve head is a short extension which serves to position the upper end of the spring 17, which tends to hold the valve from its seat. The lower end of the spring 17 bears on the block 26, which is supported upon the upper end of the adjusting screw 16.

The guide sleeve 11 is formed with downwardly inclined openings 28 therein through which the pressure fluid may enter the valve chamber 23. At the upper end of this sleeve 11 are pivoted a plurality of dogs 29. Said dogs are set within slots 30 in the upper end of the sleeve 11. Within these dogs are a series of rollers 31, the cylindrical periphery of which is held resiliently against the rounded shoulder 32 on the upper end of the valve stem. Outwardly from the pivotal point of each of the dogs 29 is a shoulder which is adapted to contact with the slidable ring 33. Said ring is held resiliently upward upon the sleeve 11 by a spring 34 which bears at its lower end against the collar 12. This spring therefore holds the rollers 31 in position tending to resist the opening of the valve.

There is a protecting cap or housing for the upper end of the flow valve which is made up of a tubular body portion 35 provided with a removable upper cap 36. The housing extends downwardly to a point about midway of the valve member and is held in position to protect the valve by being welded to the tubing as shown at 37 in Fig. 2. It will be seen that the cap member 36 may be unscrewed and removed to provide easy access to the interior of the housing.

In the operation of my device the pressure of fluid, either liquid or gaseous fluid, in the casing space 38 will be exerted upon the valve stem 20 tending to hold the valve downward. The action of the spring 34 exerted against the dogs 29 will hold the rollers against the upper shoulder on the valve stem and also tend to resist the opening of the valve. On the lower side of the valve the spring 17 will exert a predetermined pressure against the valve, tending to open it, and in addition to the action of the spring the head of liquid or fluid pressure generally within the flow tube exerted below the valve will tend to open it. We will suppose, for example, that there is within the casing space a pressure of air or other fluid of three hundred pounds exerted therein. Suppose, also, that the effect of the spring 34 acting upon the rollers 31 resist the opening of the valve with a pressure of fifty pounds. This will make a total pressure of three hundred fifty pounds resisting the opening of the valve. If on the other hand the spring 17 at the lower end of the valve exerts a pressure of one hundred pounds tending to open the valve, then a pressure of two hundred fifty pounds within the tubing will balance the pressure holding the valve closed.

As soon thereafter as the pressure within the tubing rises above two hundred fifty pounds the tubing differential will be great enough to open the valve, allowing the pressure fluid to enter through the openings 28 and past the valve through the openings 5 into the tube. This will tend to raise the head of liquid above the valve and cause it to flow at the upper end until the pressure head within the tube at the level of the well has been reduced to a point where the valve will again close.

In closing the valve it will be understood that the valve having been raised from its seat in the opening thereof the cylindrical area at 20 will be in contact with the rollers 30 and hence the movement of the valve in either direction will not be materially resisted by the pressure of the rollers. The only pressure tending to close the valve therefore will be the three hundred pounds pressure in the casing directed against the upper end of the valve. There will also be some frictional effect upon the valve of the passage of the pressure fluid in the casing past the valve and its seat which will tend to close the valve but this can be for practical purposes disregarded.

When the pressure within the tubing has therefore been reduced by approximately fifty pounds, which is the amount exerted by the dogs 29 and rollers 31, the valve will again tend to close. It will be seen, therefore, that there is a greater differential of pressure in the tubing necessary to open the valve than there is in the casing thereafter required to close the valve. If the pressure of the spring 34 and the rollers 31 is fifty pounds, then the valve will not again close until fifty pounds of the head of liquid in the tube has been discharged from above the level of the flow valve.

It will be seen therefore that there is a positive difference between the pressures which are necessary to open the valve and the pressures necessary to close the valve. By the use of valves of this kind I am enabled to construct the valve in such proportions and to arrange the spring to exert the pressure desired and thus arrange for the raising of a certain predetermined amount of liquid in the tube above the valve. The action of the valve is therefore more accurate and more reliably calculated.

If at any time there should be an excess of pressure in the flow tube above the valve sufficient to cause a flow outward through the valve into the casing, the valve will be moved upwardly to its upper seat 24 and prevent flow in the wrong direction. Thus the valve will not function to allow flow of fluid therethrough until the pressure differential in the casing over that in the tube reaches the desired value.

The further advantages thereof will be obvious to those skilled in the art.

What is claimed as new is:

1. In combination a well casing, a flow tube therein, there being openings in said tube, a valve housing outside said tubing, a passage from said housing to said opening, a valve seat in said housing, a valve in said seat to control passage of fluid therethrough, and means tending to resist the opening of said valve with a predetermined pressure, said means being inoperative while said valve is open to affect the movement of said valve.

2. In combination a well casing, a flow tube therein, there being openings in said tube, a valve housing outside said tubing, a passage from said housing to said openings, a valve seat in said housing, a valve in said seat to control passage of fluid therethrough, a spring below said valve tending to open the same with a predetermined pressure, and means tending to resist the opening of said valve with a predetermined pressure, said means being rendered inoperative when said valve is open.

3. In combination a well casing, a flow tube therein, there being openings in said tube, a valve housing outside said tubing, a passage from said housing to said openings, a valve seat in said housing, a valve in said seat to control passage of fluid therethrough, mechanical means tending to open said valve, and means bearing on said valve tending to resist its opening with a predetermined pressure, and means on said valve and acting on said last named means to render it ineffective to influence the longitudinal movement of said valve while said valve is open.

4. A well casing, a flow tube therein having an opening, a valve housing secured to said tube adjacent said opening, a fluid passage through said housing connected with said opening, a valve controlling said passage, a stem on said valve fitting in said housing, means engaging resiliently against the upper end of said stem to resist the opening of said valve with a predetermined pressure, said means being formed to exert pressure radially inwardly upon said valve when said valve has been opened.

5. A well casing, a flow tube therein having an opening, a valve housing secured to said tube adjacent said opening, a fluid passage through said housing connected with said opening, a valve controlling said passage, a stem on said valve fitting in said housing, a spring below said valve acting to exert a predetermined force to open said valve, means engaging resiliently against the upper end of said stem to resist the opening of said valve with a predetermined pressure, said means when the valve is open exerting only a radial pressure on said valve and thus exerting no longitudinal thrust thereon to influence longitudinal movement of said valve when it has been opened.

6. A well casing, a flow tube therein having an opening, a valve housing secured to said tube adjacent said opening, a fluid passage through said housing connected with said opening, a valve controlling said passage, a stem on said valve fitting in said housing, dogs on said housing, rollers on said dogs, a spring mounted to move said dogs and force said rollers against the upper end of said stem to resist opening of said valve, said rollers bearing against the outer periphery of said valve stem when said valve is open.

7. A valve housing adapted to be attached to a flow tube and connect with openings in said tube, a fluid passage through said housing, an upwardly opening valve controlling said passage, means tending to open said valve with a predetermined force, and means tending to resist said opening with a predetermined force, said last named means including spring pressed rollers bearing radially inwardly and thus being ineffective while said valve is open to affect the movement of said valve.

8. A valve housing adapted to be attached to a flow tube and connect with openings in said tube, a fluid passage through said housing, an upwardly opening valve controlling said passage, means tending to open said valve with a predetermined force, rollers bearing against the upper end of said valve with a predetermined force to resist opening of said valve, said rollers bearing against the side only of said valve when said valve is open.

WORD RAY MILLICAN.